United States Patent [19]

Gardner et al.

[11] Patent Number: 4,518,149
[45] Date of Patent: May 21, 1985

[54] VALVE ASSEMBLY AND METHOD OF MAKING SAME

[75] Inventors: John F. Gardner, Loveland, Ohio; David Hobson, Cambridge, Mass.

[73] Assignee: Xomox Corporation, Cincinnati, Ohio

[21] Appl. No.: 459,462

[22] Filed: Jan. 20, 1983

[51] Int. Cl.³ .............................................. C11D 7/08
[52] U.S. Cl. .................................. 251/144; 251/311; 137/556; 137/797
[58] Field of Search ................ 251/144, 311; 137/556, 137/797

[56] References Cited

U.S. PATENT DOCUMENTS

| 3,367,623 | 2/1968 | Piel ...................... | 251/144 |
| 3,591,131 | 7/1971 | Carlson ................ | 251/144 |
| 3,614,056 | 10/1971 | Alvarez ................ | 251/144 |
| 3,661,355 | 5/1972 | Rawstron et al. ..... | 251/144 |
| 4,198,032 | 4/1980 | Hillslead et al. ..... | 251/144 |
| 4,304,252 | 12/1981 | Stanton ................ | 251/144 |
| 4,311,298 | 1/1982 | Carlson ................ | 251/144 |
| 4,431,162 | 2/1984 | Carlson ................ | 251/144 |

FOREIGN PATENT DOCUMENTS

447106 1/1971 Fed. Rep. of Germany .

Primary Examiner—A. Michael Chambers
Attorney, Agent, or Firm—Kinney and Schenk

[57] ABSTRACT

A valve assembly for a fluid-containing tank and method of making same are provided wherein such valve assembly is mounted on a saddle fixed to a bottom portion of the tank and such valve assembly comprises a housing structure having a fluid inlet and a fluid outlet defined therein, means for mounting the housing structure against the saddle and within the confines of the tank, and a bottom operable valve member carried by the housing structure and adapted to shut off fluid flow between the inlet and outlet, and wherein the inlet and outlet are defined in the housing structure on a common rectilinear flow axis and the valve member has an opening therethrough which is adapted to be aligned between the inlet and outlet to define the open position of the valve assembly. The valve member once moved to the open position enables substantially free unobstructed flow of fluid through the valve assembly parallel to the axis and with minimum pressure drop to thereby enable a maximum rate of fluid transfer through the valve assembly.

28 Claims, 10 Drawing Figures

VALVE ASSEMBLY AND METHOD OF MAKING SAME

BACKGROUND OF THE INVENTION

1. Field of the Invention

This invention relates to a valve assembly for a fluid-containing tank and method of making same and in particular to such a valve assembly which is bottom operable and is particularly adapted to be used on such a tank of a railway tank car.

2. Description of the Prior Art

The Association of American Railroads (AAR) and Department of Transportation (DOT) have railway tank car regulations which require that projections extending in excess of one inch below the bottom of the tank of such a car must be protected by a skid, or if such a projection is part of a valve assembly associated with the tank car it must be capable of being sheared away without affecting the integrity of such valve assembly. In instances where a skid is provided the skid must be in the form of a ramp having a longitudinal dimension along the bottom of the tank which is three times the dimension projecting downwardly from such bottom. In an effort to comply with the above-mentioned regulations, various valve assemblies have been proposed heretofore for use on such tank cars; and, a typical valve assembly which has a skid defined as an integral part thereof is disclosed in U.S. Pat. No. 4,234,158.

It is also known in the art to provide a bottom operable valve assembly for a railway tank car and examples of such a valve assembly are disclosed in U.S. Pat. Nos. 3,721,424, 4,212,447, and 4,318,531.

It has also been proposed heretofore to provide a valve assembly for a tank of a railway tank car wherein such valve assembly is both top operable and bottom operable and typical examples of such a valve assembly are disclosed in the U.S. Pat. Nos. 4,280,679 and 4,313,591.

It is also known in the art to provide a so-called plug valve assembly which is usable on a railway tank car, and an example of such a plug valve assembly is illustrated in U.S. Pat. No. 3,442,490. Further, such a plug valve assembly may have means which operates independently of the seal means for the plug member thereof for controlling the leakage past the actuating stem for such plug member.

It is also known to provide a plug valve assembly wherein the plug member thereof has a reverse taper therein, i.e., the taper of the plug of such a valve is toward the actuating stem instead of away therefrom as is typical of most plug valves, and such a valve is disclosed in U.S. Pat. No. 3,263,697. Also, in the valve disclosed in this last-mentioned patent, the actuating stem of such a valve is not axially coupled to the plug.

Finally, it is well known in the art to provide so-called ball valves for various applications; and, because such ball valves are so well known, particular examples of ball valves will not be presented herein.

However, each of the above-mentioned valve assemblies and/or valves is deficient as a valve assembly for a fluid containing tank of a railway tank car in one or more of the following respects in that each valve assembly does not comply with AAR and/or DOT railway tank car regulations or if it complies with such regulations requires comparatively expensive skid means in association therewith which add to the cost of the overall valve assembly, does not provide for complete drainage of all the fluid in its associated tank, or has no provision for substantially free unobstructed flow of fluid through the valve with minimum pressure drop through such valve from the inlet through the valve closure element to the outlet thereof in a rectilinear path.

SUMMARY OF THE INVENTION

This invention provides an improved valve assembly for a fluid-containing tank, such as, a railway tank car which overcomes the above-mentioned deficiencies.

The tank of such a railway tank car has a mounting saddle fixed to the bottom portion thereof and such improved valve assembly comprises a housing structure having a fluid inlet and a fluid outlet defined therein, means for mounting the housing structure against the saddle and within the confines of the tank, and bottom operable valve means carried by the housing structure and adapted to shut off fluid flow between the inlet and the outlet.

In accordance with one embodiment of the improved valve assembly of this invention the inlet and the outlet are defined in the housing structure on a common rectilinear flow axis and the valve means has opening means therethrough which is adapted to be aligned between the inlet and the outlet to define the open position of the valve assembly. The valve means once moved to the open position enables substantially free unobstructed flow of fluid through the valve assembly parallel to the axis and with minimum pressure drop to thereby enable a maximum rate of fluid transfer through the valve.

Accordingly, it is an object of this invention to provide an improved valve assembly of the character mentioned.

Another object of this invention is to provide an improved method of making a valve assembly of the character mentioned.

Other features, objects, uses, and advantages of this invention are apparent from a reading of this description which proceeds with reference to the accompanying drawings forming a part thereof.

BRIEF DESCRIPTION OF THE DRAWINGS

The accompanying drawings show present preferred embodiments of this invention, in which.

DETAILED DESCRIPTION

Figure 1:
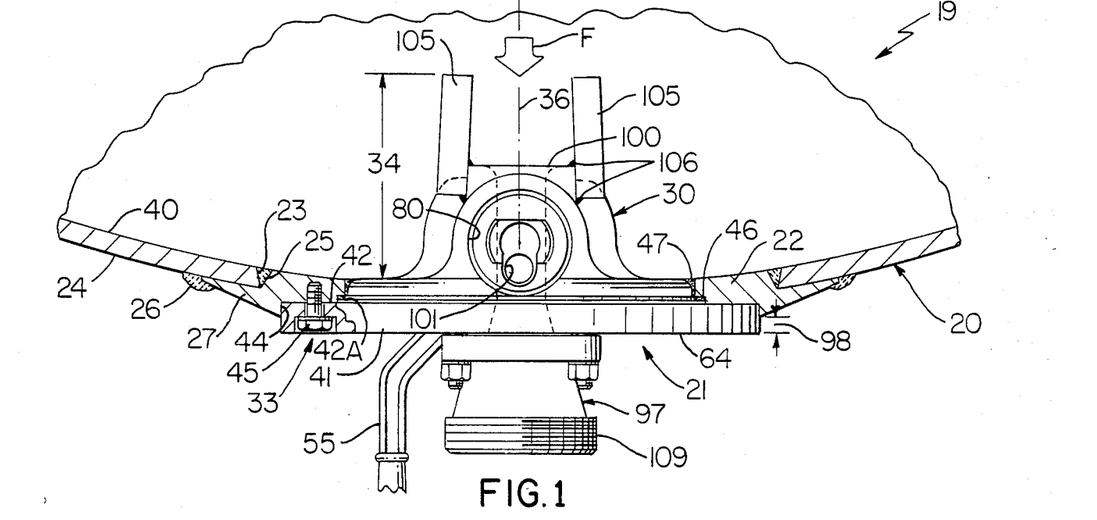
FIG. 1 is a view with parts in cross section, parts in elevation, and parts broken away illustrating one exemplary embodiment of the valve assembly of this invention mounted at the bottom of an associated railway tank car.

Reference is now made to FIG. 1 of the drawings which illustrates a fragmentary portion of a railway tank car which is designated generally by the reference numeral 19 and such railway tank car has a fluid containing tank 20 which is particularly adapted to contain a fluid for transportation, usage, and/or storage. The contained fluid may be any suitable fluid, designated schematically by a reference arrow F, and generally is in the form of a liquid, usually under positive pressure. The tank 20 utilizes one exemplary embodiment of the valve assembly of this invention and such valve assembly is designated generally by the reference numeral 21.

The valve assembly 21, being usable on fluid-containing tanks of railway tank cars, is distinguishable from valves, or the like, commonly used on a so-called railway hopper car. This latter type of car is used to contain a solid material such as particulate material, or the like, and each of such hopper cars employs a completely different type of valve or gate, which is usually not fluid tight, for emptying same.

The tank 20 has a mounting saddle 22 suitable fixed to the bottom portion thereof and such saddle 22 is disposed within a substantially circular cutout 23 in the wall 24 of such tank 20. Although the saddle 22 may be fixed in position by any suitable means, it is preferably fixed to tank 20 by an internal circular weld 25 and an external circular weld 26 provided at the outer circumferential edge of a radially extending portion 27 of saddle 22. The saddle is generally of the order of several times thicker than the thickness of the wall 24 of the tank 20 whereby the installation of the saddle 22 and the valve assembly 21 at the bottom of the tank does not result in a structural weakening of such tank 20.

Figure 4:
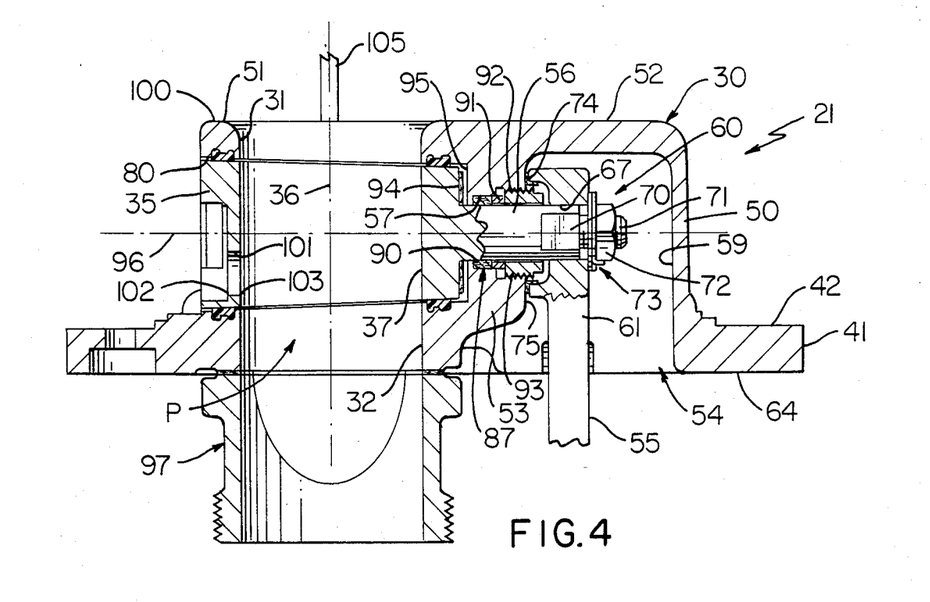
FIG. 4 is a cross-sectional view taken essentially on the line 4—4 of FIG. 3.

The valve assembly 21 comprises a housing structure which is designated generally by the reference numeral 30; and, as best seen in FIG. 4 such housing structure 30 has a fluid inlet 31 and a fluid outlet 32 defined therein. The valve assembly 21 also has means for mounting the housing structure against the saddle 22 with such mounting means being designated generally by the reference numeral 33. The mounting means 33 is used to mount the housing structure within the confines of the tank and, as seen in FIG. 1, practically the entire vertical height of the valve assembly is disposed within the tank 20, as shown by the vertical height 34.

The valve assembly 21 has a bottom operable valve means or member 35 which, as seen in FIG. 4, is carried by the housing structure 30. The member 35 is adapted to shut off fluid flow between the inlet 31 and outlet 32 and hence shut off fluid attempting to flow out of the tank 20 through the valve assembly 21.

In accordance with the teachings of this invention, the inlet 31 and outlet 32 are defined in the housing structure 30 on a common rectilinear flow axis which is indicated by dot-dash lines 36 in FIGS. 1 and 4; and, the valve member 35 has opening means in the form of an opening 37 therethrough which is adapted to be aligned between the inlet 31 and the outlet 32 to define the open position of the valve assembly 21. The valve member once moved to its open position, which is the position illustrated in FIG. 4, enables substantially free unobstructed flow of fluid F through the valve assembly 21 substantially parallel to the axis 36, i.e., along axis 36, and with minimum pressure drop to thereby enable a maximum rate of fluid transfer through such valve assembly.

In this example of the invention, with the valve assembly 21 mounted at the bottom of the tank 20, it is seen that the housing structure 30 of such valve assembly 21 is practically entirely isolated within the confines of the tank 20 and in particular within the confines of the inside surface 40 of the wall 24 of such tank. Further, the flow of fluid along the axis 36 is a rectilinear vertical flow whereby fluid flow through assembly 21 is achieved in an efficient manner.

As previously mentioned, the assembly 21 has mounting means 33 for mounting same to the saddle 22 and such mounting means 33 comprises an annular disc-like portion 41 having an annular planar surface 42, which contains the gasket surface 42A; and, it will be seen that the flow axis 36 extends perpendicular to the planar mounting surface 42.

The annular disc-like portion 41 comprising the mounting means 33 is disposed within the corresponding cutout 44 in the central bottom portion of the saddle 22; and, the mounting means 33 also comprises a plurality of threaded bolts 45 which have threaded inner end portions threadedly received within corresponding threaded portions in the saddle 22 and each bolt is provided with an associated washer which may be a lock washer, or the like. An annular gasket or sealing ring 46 is also provided in a stepped cutout in the saddle 22 and compressed in sealed relation once the disc-like portion 41 is fastened in position by bolts 45. The ring 46 may be of any suitable polymeric material (such as a suitable fluoroplastic), asbestos, or sprial wound asbestos filled metal gasket.

Once the valve assembly 21 is mounted in position utilizing the bolts 45 a suitable caulking material 47 is preferably provided between its peripheral inner edge and the wall 24 of tank 20. The caulking material 47 may be made of the same or a similar material as the sealing ring 46 and in this example is preferably a suitable fluoroplastic. In any event, the caulking material 47 is compatible with the fluid F being transported in the tank car 20.

Figure 2:
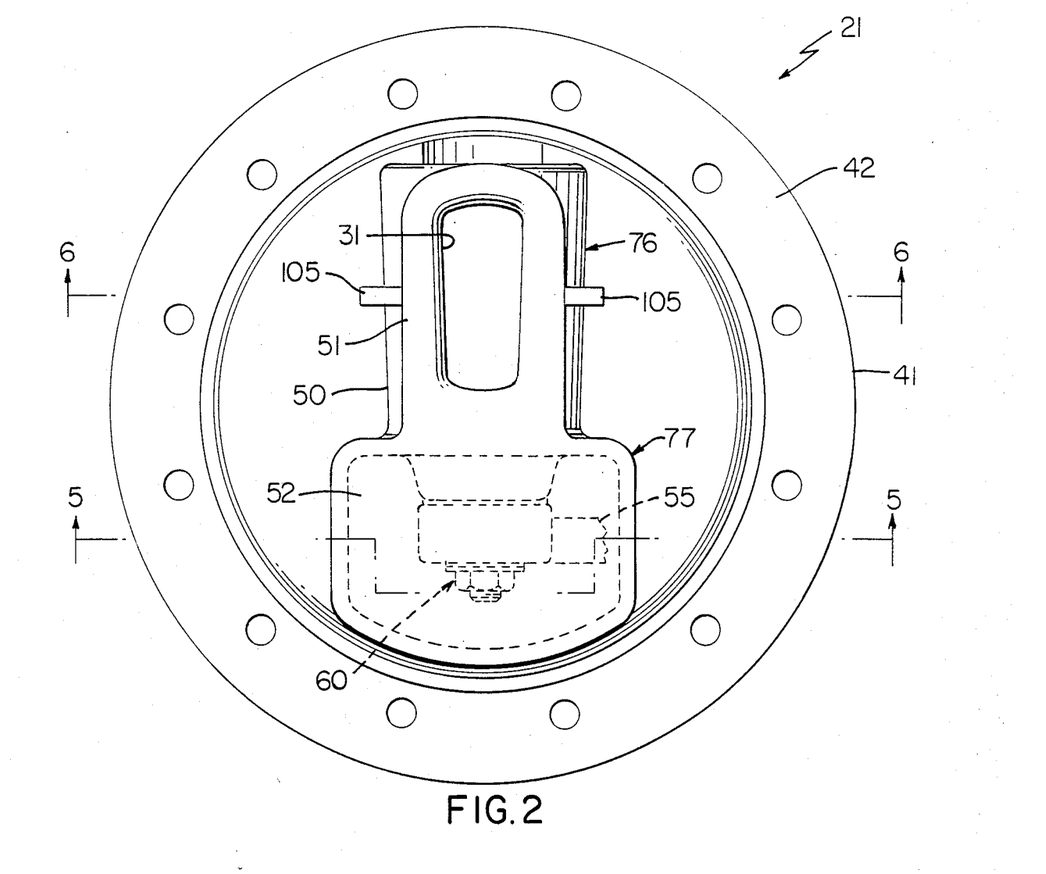
FIG. 2 is a plan view looking perpendicularly toward the valve assembly from the inside of the car.
Figure 3:
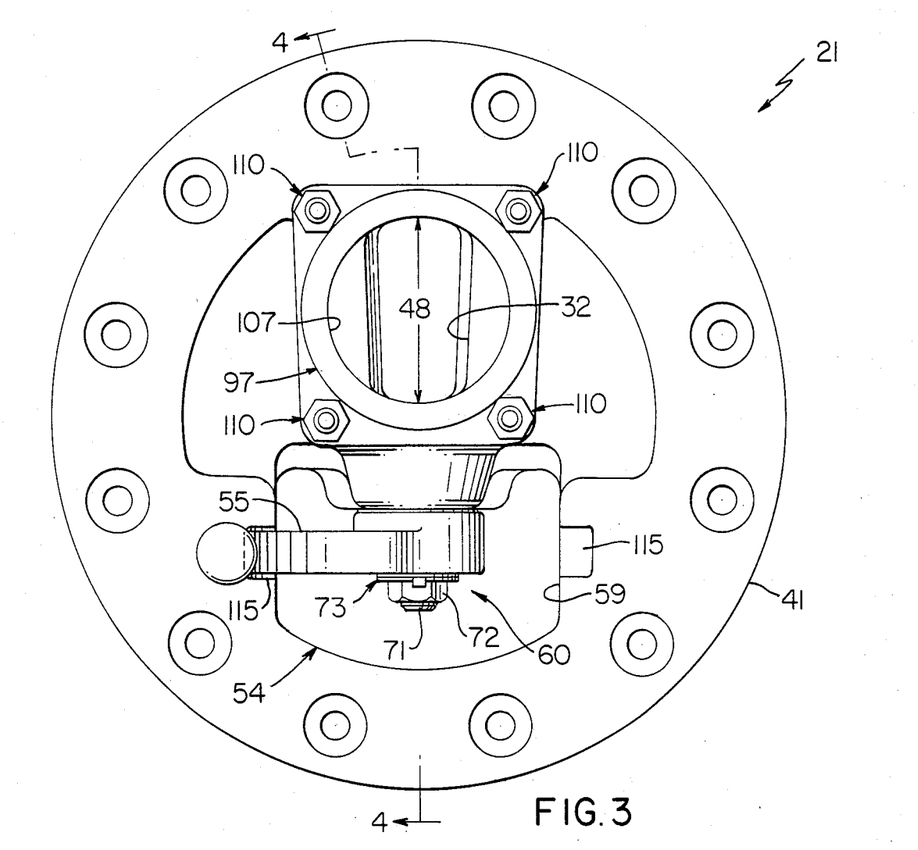
FIG. 3 is a view looking perpendicularly toward the valve assembly from the underside of the car.

To assure the unobstructed fluid flow along the flow axis 36 it will be seen that the opening 37 provided in the valve member 35 has at least one dimension 48 which is substantially equal to a corresponding dimension of the inlet 31 and outlet 32; and, this will be readily apparent from FIG. 3 of the drawings. In the instance of the valve assembly 21 of FIGS. 1-6, considerations of economy and design practicality suggest that the dimension of the opening 37 in valve member 35 which is disposed transverse the dimension 48 is less than corresponding dimensions in both the inlet 31 and outlet 32.

Referring again to FIG. 4 of the drawings the housing structure 30 has a central portion 50 which extends upwardly within the tank 20 from the mounting surface 42 once the housing structure 30 is mounted in position. The central portion 50 is divided into roughly two parts 51 and 52 respectively which are separated by a wall 53 and such wall extends perpendicular to the mounting surface 42. One of the parts, shown as part 51 in this example, has the inlet 31 and outlet 32 defined therein and the valve member 35 is disposed therebetween. The other of the parts, shown as the part 52 in this example, cooperates with the wall 53 to define an inverted cup-shaped portion 59 having an open end 54 which opens to ambient and is adapted to receive therewithin an actuating handle 55 for the valve member 35, and such handle 55 will be described in detail subsequently.

As also seen in FIG. 4 of the drawings, the valve member 35 has substantially horizontally disposed actuating stem means, shown as a horizontal actuating stem 56, which in this example is defined as an extension or integral part of the valve member 35, and the assembly 21 has stepped bore means 57 in the wall 53 which has a threaded part 93. The bore means 57 is adapted to receive the actuating stem 56 therethrough in sealed relation so that the outer end of stem 56 is disposed in the open end 54 of the inverted cup-shaped portion 59.

Figure 5:
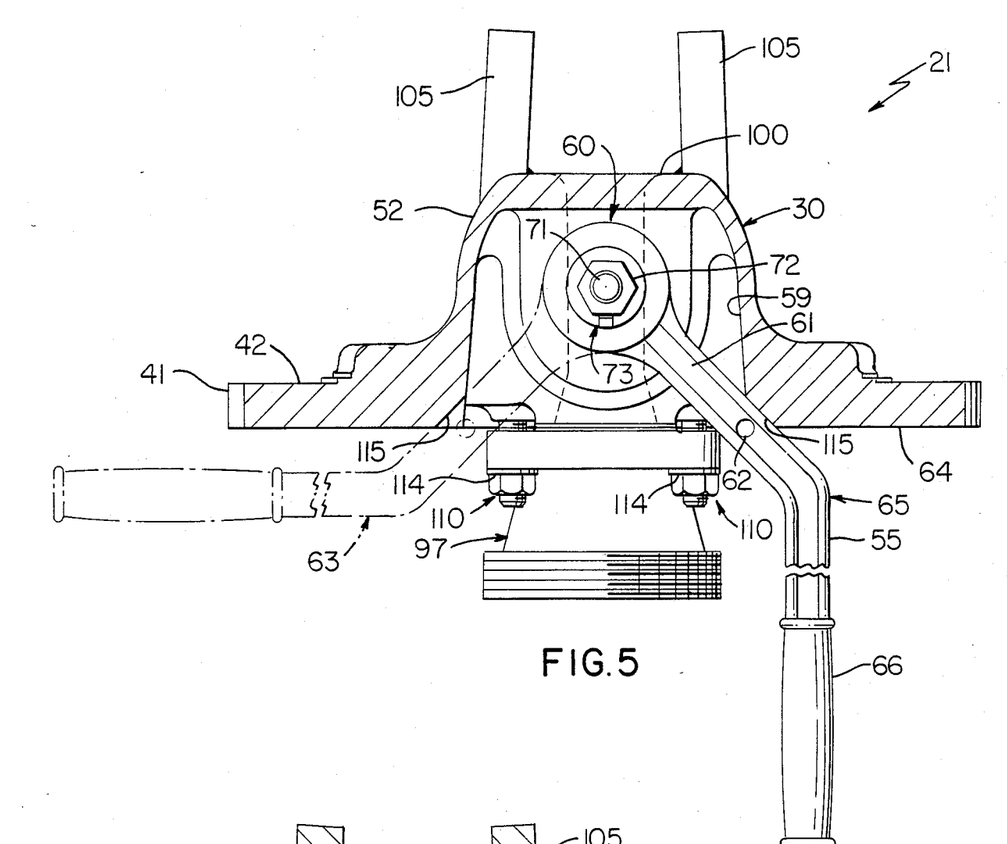
FIG. 5 is a view taken essentially on the line 5—5 of FIG. 2 and illustrating the operation of an operating handle for a valve assembly.

As previously mentioned, the valve assembly 21 has an actuating handle 55 for the valve member 35 and such handle has means 60, as shown in FIGS. 3-5, for detachably fastening an inner end portion 61 thereof to the actuating stem 56; and, the handle 55 has means enabling shearing thereof in the form of cutout means shown as an opening 62 in the inner portion 61 of such handle 55. The shearing means or opening 62 enables shearing of the handle in the event of application of a shearing force thereagainst and such shearing force would be provided in the event of derailment of the railway tank car 19.

It will be appreciated that should car derailment occur, shearing forces would be applied against the handle 55 in the position of such handle illustrated at 63 in FIG. 5 so as to engage the handle and tend to move same perpendicular to the plane of the paper with the valve assembly 21 mounted on the tank car 19. It will also be seen that a pair of cutouts 115 are provided in the housing structure 30 and the cutout 115 associated with the closed position of the valve is adapted to receive and hold the inner portion 61 of the handle 55 therein so that the shearing forces are assured of being applied as described above. As shown, the weakening means or opening 62 is provided such that it is adjacent and preferably bisected by a plane which coincides with the bottom surface 64 of the disc-like portion 41 whereby with the inner portion 61 in its closed position and nested within cutout 115 such disc-like portion provides a structure against which the handle 55 is urged to promote shearing of the parts thereof adjacent opening 62.

As also apparent from FIG. 5, the inner end portion 61 of the handle 55 has a substantially I-shaped cross section, as shown at 65, and the opening 62 is provided in the central web of the I-shaped cross section, between the opposed flanges thereof. The cutout means or opening 62 serves to reduce the effective area of the I-shaped cross section at least at one location along such cross section. Further, it will be appreciated that instead of an opening 62 of circular cross section or a cylindrical opening means 62 such weakening or opening means 62 may be defined as one or more suitable notches in the inner portion 61 of the handle 55.

The handle 55 also has a suitably contoured roughly cylindrical outer end portion 66 which is adapted to be grasped by hand. The outside surface of portion 66 may be suitably roughened or knurled and provided with annular ridges at opposite ends thereof to enable easier firm grasping.

Referring again to FIG. 4 the inner portion 61 of the handle 55 has an opening 67 provided with diametrically opposed flats (not shown) which are adapted to engage corresponding opposed flats 70 in the outer end portion of the stem 56. Once the handle 55 is installed in position on such outer end portion of the stem 56, rotation in either direction will produce rotation of such stem and the valve member 35 provided as an integral part of the stem.

The stem 56 is also provided with a threaded outer end portion 71 and a suitable nut 72 and lock washer assembly 73 is provided for holding the inner end portion 61 of the handle 55 on the outer end of the stem 56. An anti-friction annular member 74 of substantially L-shaped cross section is provided between the inside surface of the inner end portion 61 of handle 55 and a surface 75 of portion 53 to enable confined rotary movements of the handle 55 in an anti-friction manner.

As previously mentioned, the valve assembly 21 has a central portion 50 disposed within the tank 20 of the railway tank car 19 and such central portion has smooth rounded contours exposed to fluid F in such tank, and as will be readily apparent from FIGS. 2 and 4, for example. The contours assure that the fluid F within the tank is not trapped by parts of the valve assembly 21. Accordingly, such smooth contours assure optimum drainage and emptying of the entire contents of fluid in the tank 20.

Although the central portion 50 of the valve assembly 21 may have any suitable configuration or outline, such central portion in this example has a roughly T-shaped outline, as best illustrated in FIG. 2 which shows such valve assembly viewed from within the tank 20. The T-shaped outline comprises a leg 76 adjoined at one end thereof by a cross arm 77. The previously-mentioned one part is defined by the leg 76 and has the inlet 31 and outlet 32 defined therein and the other part 52 is defined by the cross arm 77.

Figure 6:
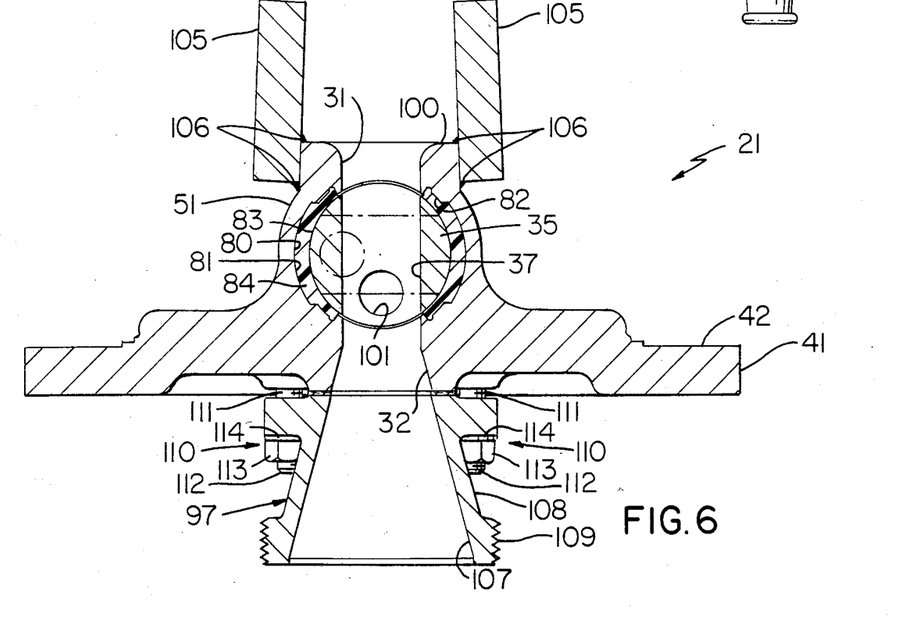
FIG. 6 is a cross-sectional view taken essentially on the line 6—6 of FIG. 2.

As best seen in FIGS. 4 and 6 the one part 51 has a substantially frustoconical bore means 80 defining a substantially frustoconical inside surface 81. The inlet 31 and outlet 32 are disposed in vertically aligned relation and at diametrically opposed positions with respect to the bore means 80. The bore means 80 with its substantially frustoconical surface 81 is a typical construction commonly provided in a plug valve and such construction has suitable annular pressure ribs 82 which function and are constructed as known in the art.

Thus, it is seen that the valve member 35 is a plug valve member disposed in the one part 51 and has a corresponding substantially frustoconical outside surface 83; and, such plug valve member 35 is rotatably supported by the one part 51. Also, as known in the plug valve art, seal means in the form of a suitable sealing structure 84 (FIG. 6) is provided between the frustoconical outside surface 83 of the plug valve member 35 and the substantially frustoconical inside surface 81 of the one part 51. The seal means 84 comprises a sealing structure which is defined as is known in the art and operatively associates with the pressure ribs 82 whereby with the plug valve member 35 in its closed position a fluid-tight seal is provided preventing leakage of fluid F through the outlet 32 of the valve assembly 21.

Referring again to FIG. 4, it is seen that the substantially frustoconical outside surface 83 of the plug valve member 35 has a taper therein which tapers toward the actuating stem 56, and, the frustoconical inside surface 81 in the part 51 and inside surface of the seal means 84 have corresponding tapers. With this construction and arrangement and with the plug valve member 35 having its stem 56 defined as an integral part thereof or fixed thereto it will be appreciated that upon tightening the nut 72 to urge the inner portion of the handle 55 against surface 75 of wall 53 a tighter fluid seal is provided between the plug valve member 35 and the one part 51.

As previously mentioned, the wall 53 between parts 51 and 52 of the housing structure 30 has bore means 57 therein. The valve assembly 21 has packing means disposed in such bore means 57 and such packing means is designated generally by the reference numeral 87. The packaging means 87 serves to prevent leakage of fluid F from within the tank 20 through the bore means 57, i.e., between the stem 56 and such bore means 57.

The packing means 87 in the bore means 57 is adjustable in an independent manner, i.e., independently of the seal means 84 for the plug member 35. The packing means 87 comprises a packing sleeve or packing 90 which may be of comprised of a plurality of chevron-type packing rings (or the like), a follower 91, and a threaded adjustment member 92 which is threadedly received within a threaded part 93 in the wall 53. This threaded part defines one end portion of the bore means 57.

The threaded member 92 is rotatable into and out of threaded engagement with the threaded portion 93 to thereby compress the packing 90 or relieve compression thereon and thereby control the fluid tightness of the seal between the wall 53 and the stem 56. In the event that the plug member 35 is moved axially too far rightwardly, as viewed in FIG. 4, an anti-friction apertured disc 94 is provided and fixed to its inner end portion to protect member 35 and wall 53. The antifriction disc 94 being adapted to engage surface of wall 53 thus serves to prevent galling and wear of the inside surface of the valve member 35 and surface 95.

Thus, it is seen that leakage of fluid F from within the tank 20 and around the stem 56 is controlled independently by the independently adjustable packing means 87. Similarly, any tendency for leakage of fluid F past the seal means 84 associated with the frustoconical surface of the plug member 35 is controlled by nut 72, and as previously described.

The plug valve member 35 is rotatable about an axis 96 which coincides with the axis of the bore 57 (FIG. 4). Further, once the plug valve member 35 is rotated to its open position the tank 20 is emptied and practically all of the fluid within such tank 20 flows in a substantially smooth uninterrupted or unobstructed vertical path from the inlet 31 through the outlet 32 and into and through an adapter 97 suitably detachably fastened to the valve assembly 21. The adapter 97 and the manner of attaching same in position will be described in detail subsequently.

Thus, it is seen that the placement of the valve assembly 21 substantially completely within the tank 20 solves numerous problems associated with so-called lading valves, or valves of this type, utilized on railway cars. Further, because only a small portion 98 (FIG. 1) of the valve assembly 21 projects beneath the body of the tank car 19, with portion 98 being roughly an inch, or less, there is no need to provide protective ramps or skids surrounding the disc-like portion 41 of the valve assembly.

The adapter 97 projects outwardly beyond, i.e., beneath, the bottom surface 64 of the disc-like portion 41. However, the adapter 97 as well as the outer portion of the handle 55, which are both beneath the bottom surface 64 are both easily or readily sheared off in case of accident while the valve assembly 21 is fully protected and functional even with the adapter 97 and outer portion of the handle 55 sheared away.

As previously mentioned, practically all of the fluid F in the tank 20 may be drained through a rectilinear vertically disposed flow passage P having flow axis 36. However, that part of fluid in the tank beneath the top surface 100 (FIG. 4) of the housing structure 30 and hence beneath the inlet 31 is also readily drained due to the unique construction of the plug valve member 35 of the valve assembly 21 of this invention.

In particular, and as also seen in FIG. 6, the plug valve member 35 has a cylindrical opening 101 therein which is disposed substantially parallel to the central axis 96 of such valve member 35. Thus, with the valve member 35 in its open position as illustrated in FIG. 4 the opening 101 lies in a plane which substantially bisects the flow passage having axis 36; and, defined by the inlet 31, opening 37 in the valve member 35, and outlet 32. The cylindrical opening 101 has an outer end 102 in flow communication with the fluid F in the tank 20 and an inner end 103 in flow communication with the flow passage P having flow axis 36 and with the valve member 35 open. With this construction, once the level of fluid F in the tank 20 is beneath the top surface 100 of the central portion 50 of the housing structure 30, continued flow is through the cylindrical passage 101 whereby complete drainage of any fluid F in the tank 20 is achieved.

Referring now to FIGS. 2 and 6 of the drawings, the valve assembly 21 also has vortex breaking means shown as a pair of vortex breakers 105 provided on opposite sides of part 51 of the housing structure 30. The vortex breakers 105 are suitably fixed to opposite side portions of the housing structure 30 as by welds 106; and, such vortex breakers serve to prevent any vortex action by the fluid F during emptying thereof from the tank 20.

As previously mentioned, the valve assembly 21 has a readily shearable adapter 97 which is fastened to such valve assembly 21 to facilitate emptying of the tank 20. As seen in FIG. 6, the adapter 97 in this example of the invention has an outwardly, i.e., downwardly, flaring opening 107 which has an outer portion 108 provided with a threaded male connector 109. The threaded connector 109 is particularly adapted for attachment to a suitable conduit or pipe to facilitate the emptying of the tank 20 into a desired container, receptacle, conduit system, or the like.

The adapter 97 (FIG. 6) is fastened in position utilizing a plurality of shearable fasteners which are designated generally by the reference numeral 110. The fasteners 110 may be of any suitable type known in the art and in this example of the invention comprise a plurality of shearable studs 111 each having one end portion threaded within the housing structure 30 and a threaded outer end portion 112. The adapter has openings in a mounting flange therefor, and each end portion 112 is received through an associated flange opening and threaded nuts 113, and associated washers 114, are threaded on portions 112 to hold the mounting flange and adapter 97 against the valve assembly 21. The studs 112 are designed such that once a force of predetermined magnitude is applied against the adapter 97 the studs 111 are sheared thereby shearing the adapter 97 away from the bottom of the tank 20.

Thus, with the adapter 97 being easily shearable and the handle 55 also being shearable away from the valve assembly 21 nothing remains projecting beneath the bottom of the tank 20 that would tend to damage the valve assembly 21 such that it could not be opened in an emergency, if desired.

In this connection it is seen that the inverted cup-shaped portion 53 with its open end 54 thereof is such that once the handle 55 is sheared in the vicinity of the weakening opening 62, a so-called cheater bar, or the like, may be disposed around the remaining stub portion of the inner end 61 of the handle 55 to enable operation of the valve member 35 as desired. It will also be seen that the previously described oppositely disposed cutouts 115 provided in the housing structure 30 (FIGS. 3 and 5) also enable the inner portion 61 of the handle 55 to be moved through the desired angular distance, generally of the order of 90°, whereby the valve member 35 is easily moved from its fully closed position, shown by the dotted lines in FIG. 5, to the solid line position of the handle illustrated in FIG. 5 which is the open position of the valve member.

Other exemplary embodiments of the valve assembly of this invention are illustrated in FIGS. 7-8 and 9-10. The valve assemblies illustrated in FIGS. 7-8 and 9-10 are similar to the valve assembly 21; therefore, such valve assemblies will be designated by the reference numerals 21A and 21B respectively and representative parts of each valve assembly which are similar to corresponding parts of the valve assembly 21 will be designated in the drawings by the same reference numerals as in the valve assembly 21 (whether or not such representative parts are mentioned in the specification) followed by an associated letter designation either "A" or "B" and not described again in detail. Only those component parts of each valve assembly 21A or 21B which are different from corresponding parts of the valve assembly 21 will be designated by a new reference numeral also followed by the associated letter designation and described in detail.

Figure 7:
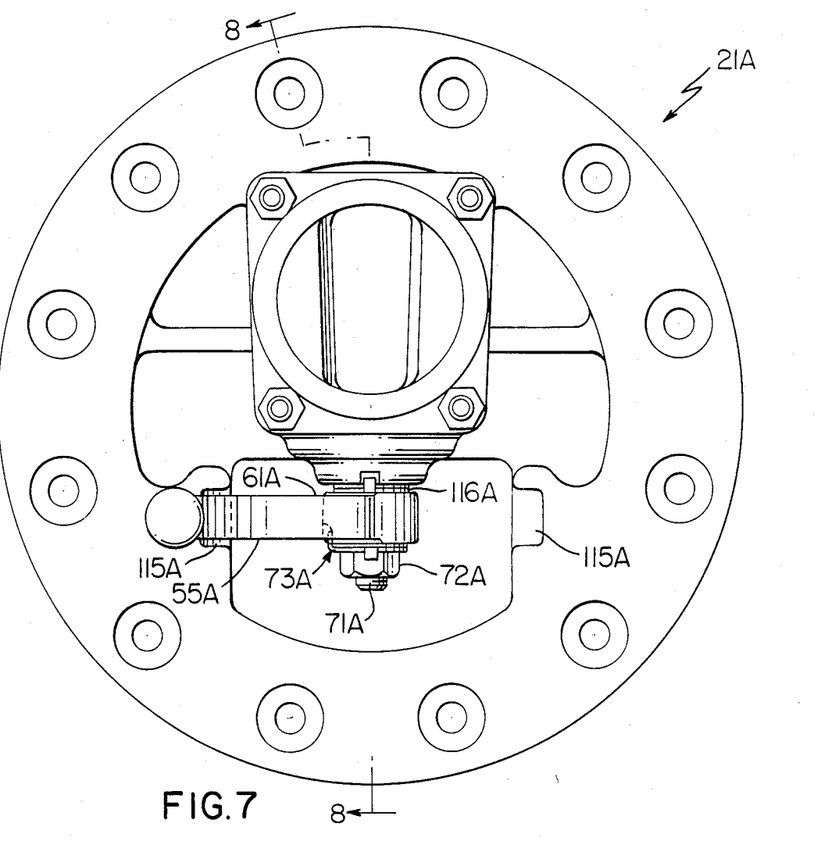
FIG. 7 is a view similar to FIG. 3 illustrating another exemplary embodiment of the valve assembly of this invention.
Figure 8:
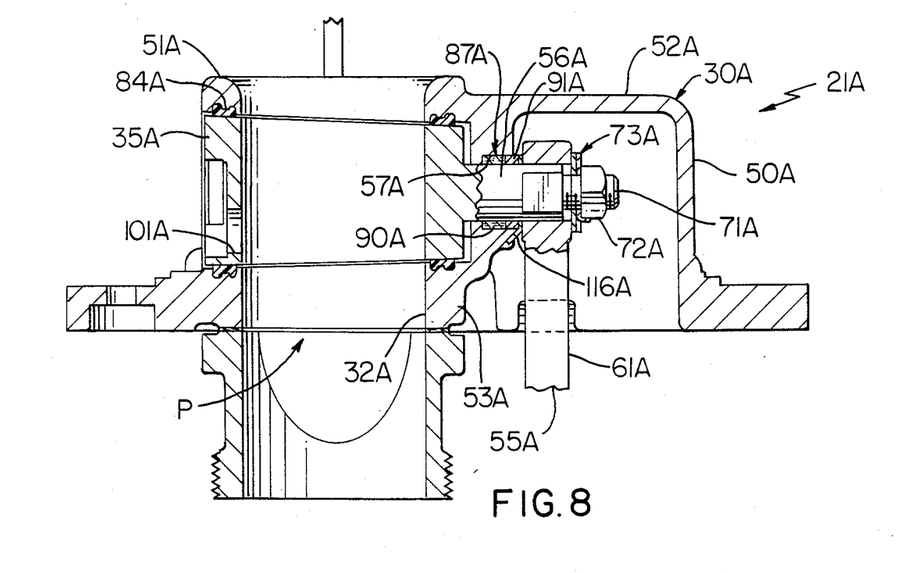
FIG. 8 is a cross-sectional view taken essentially on the line 8—8 of FIG. 7.

The valve assembly 21A of FIGS. 7 and 8 may be used interchangeably with the valve assembly 21 and such valve assembly also comprises a housing structure 30A comprised of central part 50A provided with part 51A at one side thereof and part 52A at an opposite side thereof. The valve member 35A is also a plug valve member and also has a cylindrical drainage opening 101A therein. In addition, the plug valve member 35A is provided with an integral stem 56A in a similar manner as the previously described valve member 35.

The main difference between the valve assembly 21A and valve assembly 21 is in the provision of a single adjustment which adjusts the plug valve member 35A against its seal means 84A and simultaneously adjusts the packing means 87A. Thus, with the threaded adjustment of a single member, i.e., along threaded outer portion 71A of the stem 56A, the packing means 87A and the seal means 84A are both simultaneously adjusted to prevent leakage from the outlet 32A as well as prevent leakage of fluid F from the tank 20 from between the stem 56A and bore means 57A in the wall 53A.

The packing means 87A of valve assembly 21A is comprised of a packing 90A which may be in the form of a plurality of chevron packing rings, a follower 91A, and a suitable anti-rotation washer 116A which prevents rotation of the packing 87A and follower 91A. It will also be seen that a suitable washer assembly 73A is also provided between the inner portion 61A of the handle 55A and the adjustment nut 72A. The valve assembly 21A has opposed cutouts 115A therein in the form of substantially U-shaped channels. The cutouts 115A are adapted to receive the inner end portion 61A of the handle 55A therewithin and are dimensioned and disposed so as to assure that the handle 55A may be rotated through the desired angular distance for opening and closing movements of the plug member 35A; and, cutouts 115A also receive portion 61A in nested relation for similar purposes as described earlier for cutouts 115 and portion 61 of valve assembly 21.

It will be appreciated that the operation of the valve assembly 21A is substantially identical to the operation of the valve assembly 21 except for areas mentioned above.

Figure 9:
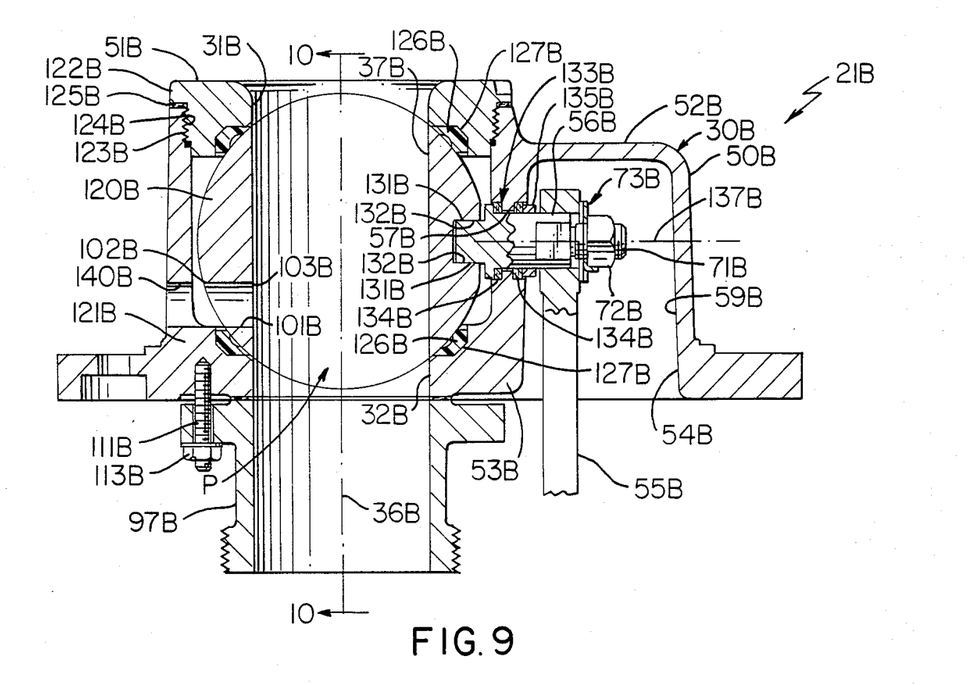
FIG. 9 is a cross-sectional view similar to FIG. 4 illustrating still another exemplary embodiment of the valve assembly of this invention.
Figure 10:
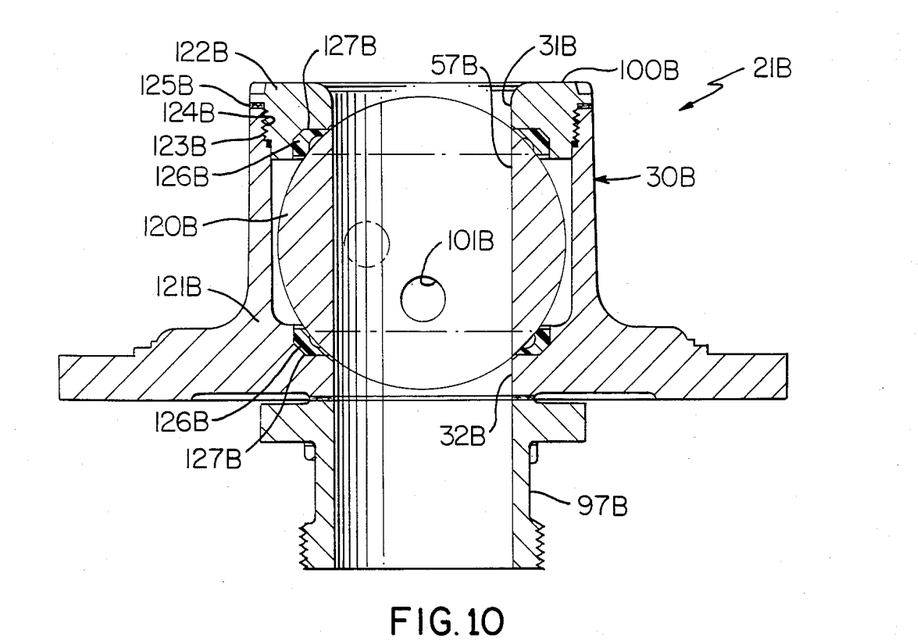
FIG. 10 is a cross-sectional view taken essentially on the line 10—10 of FIG. 9.

The valve assembly 21B of FIGS. 9-10 may also be used interchangeably with the valve assembly 21 on the tank 20 and the operation of valve assembly 21B is substantially identical to the operation of the assembly 21. The valve assembly 21B has a housing structure 30B comprising a central portion 50B having one part 51B at one side thereof and another part 52B at the other side thereof with an integral wall 53B therebetween defining an inverted cup-shaped portion 59B having an open end 54B. The valve member in this example is a ball valve member 120B and is suitably rotatably supported in position between a lower portion 121B of the part 51B and upper threaded portion 122B comprising the top of part 51B. The part 122B has an externally threaded lower portion 123B which is threadedly received within cooperating internal threads 124B in the part 51B with an annular seal 125B therebetween.

It will also be seen that seal means in the form of a pair of annular seals 126B are provided in cooperating annular grooves 127B in top and bottom portions of part 51B. The annular seals 126B are adapted to engage the ball valve member 120B to provide a fluid seal between the fluid F in tank 20 and the outlet 32B in the assembly 21B.

The valve assembly 21B also has an adapter 97B suitably fixed in position by shearable studs 111B and associated nuts 113B and the operation of the studs 111B is as previously described for the similar studs 111.

It will also be seen that the valve assembly 21B has a handle 55B which is held in position by a washer assembly 73B and a nut 72B which is threaded on the threaded end portion 71B of actuating stem 56b for the ball valve member 120B. The actuating stem 56B has opposed flat surfaces 131B defining the inner end portion thereof that are adapted to engage corresponding opposed flat surfaces 132B in the ball valve member 121B whereby the member 120B may be rotated between its open and closed positions by rotating the handle 55B and hence the actuating stem 56B in a similar manner as previously described for the stem 56 and handle 55 of valve assembly 21.

However, it will be seen that the stem 56B in this example of the invention is not provided as an integral part of the valve member 120B and indeed merely operatively associates therewith whereby the actuating stem 56B and member 120B are rotatably coupled but are free from coupling along the axis of the member 56B. To prevent leakage out of the tank 20 and through bore means 57B in the wall means 53B it will be seen that a seal assembly 133B is provided and such seal assembly may be comprised of any suitable seal means known in the art.

The seal assembly 133B of this example comprises a pair of annular spaced apart sealing members 134B and a backup ring 135B engaging one of such members 134B. The seal assembly 133B prevents leakage of fluid F between the actuating stem 56B and the bore means 57B.

The valve member 120B has an opening 37B therethrough and it will be seen that the part 51B and in particular the upper portion 122B of such part has the inlet 31B defined therein. The opening 37B is adapted to be aligned between the inlet 31B and the outlet 32B to define the open position of the valve assembly and the valve member, i.e., the ball valve 120B. Once the ball valve 120B is moved to the open position this enables substantially free unobstructed flow of fluid through a vertical flow passage P through the valve assembly 21B parallel to the rectilinear flow axis 36B to thereby provide minimum pressure drop and enable a maximum flow rate through the valve assembly 21B in a similar manner as previously described for the valve assembly 21.

It will also be seen that the ball valve assembly 21B has cylindrical opening 101B therein which is disposed substantially parallel to an axis which coincides with a central axis 137B through the actuating stem 56B. The opening 101B serves the same purpose for assembly 21B or opening 101 for assembly 21. In particular opening 101B drains fluid in tank 20 below a top surface 100B of the valve assembly 21B. It should also be noted that with the ball valve member 120B in its open position, which is the position illustrated in FIG. 9, the cylindrical opening 101B lies in a plane which substantially bisects the flow passage defined by the inlet 31B, the opening 37B in the ball valve member 120B with the member 120B in its open position, and the outlet 32B. The cylindrical opening 101B has an outer end 102B in flow communication with the fluid F in the tank 20 and an inner end 103B in flow communication with the flow passage with the ball valve member 120B open.

It should also be noted that with valve member 120B open the inner end 102B of the cylindrical passage 101B is aligned with another opening 140B in portion 51B which allows fluid F in the tank 20 to enter the inlet 102B. Thus, in a similar manner as described previously, once the level of the fluid F in the tank 20 is beneath the top surface 100B of the central portion 50B, continued flow is through the cylindrical passage 101B whereby complete drainage of any fluid F in a tank 20 associated with assembly 21B is provided.

In this disclosure of the invention each plug valve is shown with its valve member provided with the actuating stem thereof defined as an integral part of the main frustoconical part of the plug valve; however, the ball valve member is shown with its actuating stem as a separate part. However, it will be appreciated that these constructions may be reversed whereby the plug valve members may be provided with actuating stems similar to the actuating stem shown for the ball valve member and the ball valve member may be provided with an integral actuating stem similar to the plug valve members.

The use of a plug valve assembly for a railway tank car is especially advantageous. For example, should derailment of the tank car occur it is comparatively more difficult to open the valve due to the construction of such a plug valve and in particular its plug valve member. However, the actuating stem and indeed substantially the entire valve assembly are in a protected position within the tank of the tank car whereby it is a simple matter, even with a valve assembly having a sheared handle to open the valve assembly, if desired.

The various seal materials utilized to define the valve assemblies 21, 21A, and 21B of this disclosure may be suitable materials known in the art provided that such materials are compatible with the structure of their tank car and the fluid being transported and coming into contact therewith.

Thus, it is seen that each embodiment of the valve assembly of this invention disclosed herein overcomes the deficiencies of prior art valve assemblies and in each instance results in a valve assembly of improved performance and reliability.

In this disclosure of the invention each valve assembly 21, 21A, 21B has been described in connection with the utilization thereof on a tank 20 of a railway tank car. However, it will be appreciated that such a valve assembly may be utilized on any suitable tank including a railway tank car as shown, a tank comprising an over-the-highway vehicle, a stationary tank, or a tank that comprises any moving conveyance.

In this disclosure of the invention, each valve assembly 21, 21A, and 21B is shown having a rotatable valve member which is either in the form of a plug valve member or a ball valve member. However, it is to be understood that a butterfly valve member, or the like, may be provided as long as the other parameters of this invention are satisfied.

In this disclosure of the invention use has been made of terms such as upper, lower, inner, outer, top, bottom, and the like. However, it is to be understood that these terms are used to describe each valve assembly and various components thereof as illustrated in the drawings and such terms are not to be considered limiting in any way.

While present exemplary embodiments of this invention, and methods of practicing the same, have been illustrated and described, it will be recognized that this invention may be otherwise variously embodied and practiced within the scope of the following claims.

What is claimed is:

1. In a valve assembly for a fluid-containing tank which has a mounting saddle fixed to the bottom portion thereof, said valve assembly comprising, a housing structure having a central portion with a fluid inlet and a fluid outlet defined therein, means for mounting said housing structure against said saddle so that said housing structure and its said central portion are substantially within the confines of said tank, and bottom operable valve means carried by said housing structure and adapted to shut off fluid flow between said inlet and said outlet, the improvement wherein said inlet and said outlet are defined in said housing structure on a common rectilinear flow axis, said valve means has opening means which is adapted to be aligned between said inlet and said outlet on said rectilinear flow axis to define the open position of said valve assembly, said central portion has a top surface and has said inlet and outlet defined therein, said valve means is disposed between said inlet and outlet within the confines of said tank, said valve means has a drain opening therein which is disposed substantially perpendicular to said rectilinear flow axis, said drain opening having an outer end in flow communication with the fluid in said tank and an inner end in flow communication with said rectilinear flow axis with said valve means in said open position, said valve means once moved with its opening means aligned to define said open position enabling substantially free unobstructed flow of fluid through said valve assembly parallel to said axis and with minimum pressure drop to thereby enable the fluid in said tank above said top surface to be discharged through said valve assembly at a maximum rate of fluid transfer, and once the level of fluid in said tank is beneath said top surface of said central portion continued flow is through said drain opening to thereby allow complete drainage of any fluid in said tank.

2. A valve assembly as set forth in claim 1 in which said housing structure has an integral bottom portion which has said mounting means defined as a part thereof.

3. A valve assembly as set forth in claim 2 in which said housing structure has said bottom portion defined integrally therewith as a single-piece structure and said mounting means is defined as an integral part of said single-piece structure.

4. A valve assembly as set forth in claim 2 in which, said mounting means comprises a mounting surface which is disposed against said saddle, said flow axis extends substantially perpendicular to said mounting surface, and said valve means has actuating stem means disposed inwardly of said mounting surface and also substantially within the confines of said tank.

5. A valve assembly as set forth in claim 4 in which said mounting means comprises an annular disc-like portion having said mounting surface as an annular planar surface.

6. A valve assembly as set forth in claim 4 in which said actuating stem means is disposed substantially parallel to said mounting surface and substantially within the confines of said tank.

7. A valve assembly as set forth in claim 6 in which said actuating stem means is a substantially horizontally disposed actuating stem.

8. A valve assembly as set forth in claim 6 in which said actuating stem means is a rotatable stem.

9. A valve assembly as set forth in claim 8 in which said rotatable stem is rotatable through an angular increment generally of the order of 90 degrees to align said opening means of said valve means between said inlet and said outlet to define said open position.

10. A valve assembly as set forth in claim 6 in which said mounting surface is a substantially planar surface.

11. A valve assembly as set forth in claim 6 and further comprising an actuating handle for said valve means, said handle having means for detachably fastening an inner end thereof to said actuating stem means, and means enabling shearing of said handle in the event of the application of a shearing force thereagainst.

12. A valve assembly as set forth in claim 6 in which; said integral bottom portion of said housing structure has a bottom surface which defines a shear plane; said housing structure has a pair of oppositely arranged cutouts therein; and further comprising an actuating handle for said valve means, said handle being detachably fastened to said actuating stem means and having an inner end portion which is adapted to be received within said cutouts; said cutouts having surfaces defining opposed stops which establish fully open and fully closed positions of said valve means; said handle having weakening means in its inner end portion; one of said cutouts being associated with the fully closed position of said valve and having surfaces holding said inner end portion of said handle with its weakening means substantially coplanar with said shear plane; whereby in the event shearing forces are applied against the outer end of said handle, said weakening means, said bottom surface defining said shear plane, and one cutout cooperate to enable efficient shearing of said handle while assuring said actuating stem means and valve means are kept intact and functional.

13. A valve assembly as set forth in claim 12 in which said mounting means comprises an annular disc-like portion having said mounting surface as an annular planar surface, said bottom surface is a planar bottom surface of said disc-like portion, said annular planar surface and planar bottom surface being disposed in parallel relation, and further comprising an adapter for flowing fluid from said valve assembly therethrough, said adapter being fastened by shearable fasteners against said planar bottom surface, said adapter communicating with said fluid outlet and said shearable fasteners enabling shearing of said adapter away from said bottom surface while keeping the remainder of said valve assembly intact.

14. A valve assembly as set forth in claim 12 in which said inner portion of said handle has a particular cross-sectional area and said weakening means comprises means serving to reduce said cross-sectional area of said inner portion of said handle in at least one selected location therealong.

15. A valve assembly as set forth in claim 1 in which said drain opening is a cylindrical opening, said housing structure has an integral bottom portion which has said mounting means defined as a part thereof, and said mounting means comprises a mounting surface which is disposed against said saddle.

16. A valve assembly as set forth in claim 15 in which said central portion extends substantially within said confines of said tank from said mounting surface with said housing structure mounted in position, said central portion is divided into roughly two parts separated by a wall which extends perpendicular to said mounting surface, one of said parts having said inlet and outlet defined therein and the other of said parts cooperating with said wall to define an inverted cup-shaped portion having an open end which opens to ambient and is adapted to receive therewithin an actuating handle for said valve means.

17. A valve assembly as set forth in claim 16 in which said valve means has an actuating stem and further comprising bore means in said wall, said bore means being adapted to receive said actuating stem therethrough in sealed relation so that the outer end of said stem is disposed in said open end of said cup-shaped portion.

18. A valve assembly as set forth in claim 17 in which said one part has a substantially frustoconical bore means defining a substantially frustoconical inside surface, said inlet and said outlet being disposed at vertically arranged diametrically opposed positions with respect to said bore means, and said valve means is a plug valve member disposed in said one part and has a corresponding substantially frustoconical outside surface, said plug valve member being rotatably supported by said one part, and seal means between said frustoconical outside surface of said plug valve member and said frustoconical inside surface of said one part.

19. A valve assembly as set forth in claim 18 in which said frustoconical outside surface of said plug valve member has a taper therein which tapers toward said actuating stem and said frustoconical inside surface has a corresponding taper.

20. A valve assembly as set forth in claim 19 and further comprising packing means disposed in said bore means in said wall, said packing means being disposed between said actuating stem and said wall and preventing leakage of fluid from within said tank through said bore means in said wall.

21. A valve assembly as set forth in claim 20 in which said packing means in said bore means in said wall is adjustable in an independent manner and the sealing character of said seal means between said frustoconical surfaces is improved by adjusting said plug valve member toward said wall.

22. A valve assembly as set forth in claim 20 in which said plug valve member is rotatable about an axis which coincides with the axis of said bore means in said wall, and said packing means in said bore means and said seal means between said frustoconical surfaces are adjusted to improve the sealing character of both in a simultaneous manner.

23. A valve assembly as set forth in claim 18 in which said opening means comprises a single opening in said plug valve member, said opening having at least one dimension which is substantially equal to a corresponding dimension of said inlet and said outlet.

24. A valve assembly as set forth in claim 18 in which said plug valve member has said cylindrical opening therein which is disposed substantially parallel to its central axis such that with the plug valve member in its open position said cylindrical opening lies in a plane which substantially bisects the flow passage defined by said inlet, said opening in said plug valve member with said plug valve member open, and said outlet.

25. A valve assembly as set forth in claim 16 in which said central portion has a roughly T-shaped outline when viewing the top thereof from within said tank, said T-shaped outline comprising a leg adjoined at one end by a cross arm, said one part being defined by said leg and having said inlet and outlet defined therein, and said other part being defined by said cross arm.

26. A valve assembly as set forth in claim 16 in which said central portion has smooth rounded contours exposed to fluid in said tank, said contours assuring that fluid within said tank is not trapped by parts of said valve assembly.

27. A valve assembly as set forth in claim 16 in which said valve means is a ball valve member.

28. A valve assembly as set forth in claim 1 wherein said fluid-containing tank is a fluid-containing tank of a railway tank car and said drain opening is a cylindrical opening.

* * * * *